United States Patent [19]

Shinohara

[11] Patent Number: 5,769,642

[45] Date of Patent: Jun. 23, 1998

[54] AUDIO-BOOK PLAYER

[75] Inventor: Hiromu Shinohara, Ueda, Japan

[73] Assignee: Shinano Kenshi Kabushiki Kaisha, Nagano-ken, Japan

[21] Appl. No.: 747,646

[22] Filed: Nov. 13, 1996

[30]     Foreign Application Priority Data

Nov. 13, 1995 [JP] Japan .................................. 7-294024

[51] Int. Cl.$^6$ .................................................. G09B 21/00
[52] U.S. Cl. ........................ 434/317; 434/112; 434/113; 434/114; 434/116
[58] Field of Search ............................ 434/112–117, 317

[56]              References Cited

U.S. PATENT DOCUMENTS 4,636,881  1/1987  Brefka et al. .
5,577,914  11/1996  Takahashi et al. ...................... 434/113

*Primary Examiner*—Richard J. Apley
*Assistant Examiner*—Glenn Richman
*Attorney, Agent, or Firm*—Birch, Stewart, Kolasch & Birch, LLP

[57]              ABSTRACT

An audio-book player includes a member capable of indicating to a blind person that a recording medium is loaded in or unloaded from the body proper. The audio-book player, which reproduces written data recorded on a recording medium as voice, includes a body proper into which the recording medium can be unloadably loaded and a member for identifying a loading state, in which the recording medium is loaded in the body proper, and an unloading state, in which the recording medium is unloaded therefrom. With this structure, the identifying member identifies the states by changing its tactile impression, so that blind persons can understand the states wherein recording medium is loaded in or unloaded from the body proper.

6 Claims, 4 Drawing Sheets

AUDIO-BOOK PLAYER

BACKGROUND OF THE INVENTION

1. Field of the Invention

The present invention relates to an audio-book player, to which a recording medium, e.g., a CD-ROM, can be unloadably loaded, and which is capable of reading the written data recorded on the recording medium and reproducing said written data as voice. Especially, the audio-book player is used for reading books by blind persons.

2. Description of Background Art

A conventional audio-book player has a door member, which is capable of opening and closing a loading entrance, through which the recording medium, e.g., the CD-ROM, is inserted and ejected. The door member is always biased to close the loading entrance by a spring so as to prevent dusts, etc. from entering a body proper of the audio-book player.

When the recording medium is loaded, the recording medium is conveyed from the loading entrance to a playing position by a loading mechanism to reproduce the written data as voice. In the loading state too, the door member is biased to close the loading entrance by the spring, so a user cannot understand, by outward appearance, if the recording medium is loaded or unloaded. The user sometimes tries to load the recording medium despite another recording medium which has already been loaded in the body proper.

In the conventional audio-book player, there is provided a light emitting diode (LED) unit or a liquid crystal display (LCD) unit in the body proper, which is capable of noticing if the recording medium is loaded in or unloaded from the body proper.

The audio-book player is used by not only ordinary persons but also blind persons.

However, the blind persons cannot see the LED or the LCD unit, so it is impossible to confirm if the recording medium is loaded or unloaded by their eyes. Even if they move the door member to open the loading entrance, they cannot confirm by their eyes, either. So they sometimes try to load the recording medium despite another one which has already been loaded in the body proper.

SUMMARY OF THE INVENTION

An object of the present invention is to provide an audio-book player, which has means capable of indicating to a blind person that a recording medium is loaded in or unloaded from the body proper.

To achieve this object, the audio-book player of the present invention for reproducing written data recorded on a recording medium as voice, comprises:

a body proper into which the recording medium can be unloadably loaded; and means for identifying a loading state, in which the recording medium is loaded in the body proper, and an unloading state, in which the recording medium is unloaded therefrom, the identifying means identifying the loaded and unloaded states by changing tactile impression.

In the audio-book player of the present invention, the identifying means identifies the states (the loading state and the unloading state) by changing its tactile impression, so the blind persons can understand the states when the recording medium is loaded in or unloaded from the body proper.

In the audio-book player, the identifying means may include:

a moving member being provided in a through-hole of the body proper, the moving member being capable of projecting outwardly from and retracting into the through-hole; and means for moving the moving member so as to change the projecting length of the moving member from the body proper according to said states.

In the audio-book player, the moving member may be always biased inwardly by a spring, wherein the moving means moves the moving member to a first position, at which the moving member projects from the body proper, while the audio-book player is in the unloading state; the moving means releases the moving member so as to move the moving member to a second position, at which the moving member is retracted into the body proper, by the spring while the audio-book player is in the loading state.

In the audio-book player, the identifying means may include:

a door member for opening and closing a loading entrance of the body proper, from which the recording medium is loaded into the body proper;

a spring for always biasing the door member to close the loading entrance; and means for holding the door member so as not to open the loading entrance while the audio-book player is in the loading state.

With this structure, the existence of the recording medium can be known by touching the door member. And anther recording medium cannot be inserted into the loading entrance while the audio-book player is in the loading state, so damaging the audio-book player by misloading can be prevented.

In the audio-book player, the holding means may include; a loading mechanism, which conveys the recording medium to a playing position in the body proper when the recording medium is inserted in the loading entrance, and which conveys the same from the playing position to the loading entrance when playing the recording medium is stopped; and a door lever having one end pivotably connected to the body proper and the other end pivotably connected to the door member, the door lever is actuated by the loading mechanism when the loading mechanism conveys the recording medium to the playing position, whereby the door member is moved to close the loading entrance and held in the closing state.

With this structure, the conventional loading mechanism can be used as the holding means, so manufacturing cost can be reduced.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

(First Embodiment)

Figure 1:
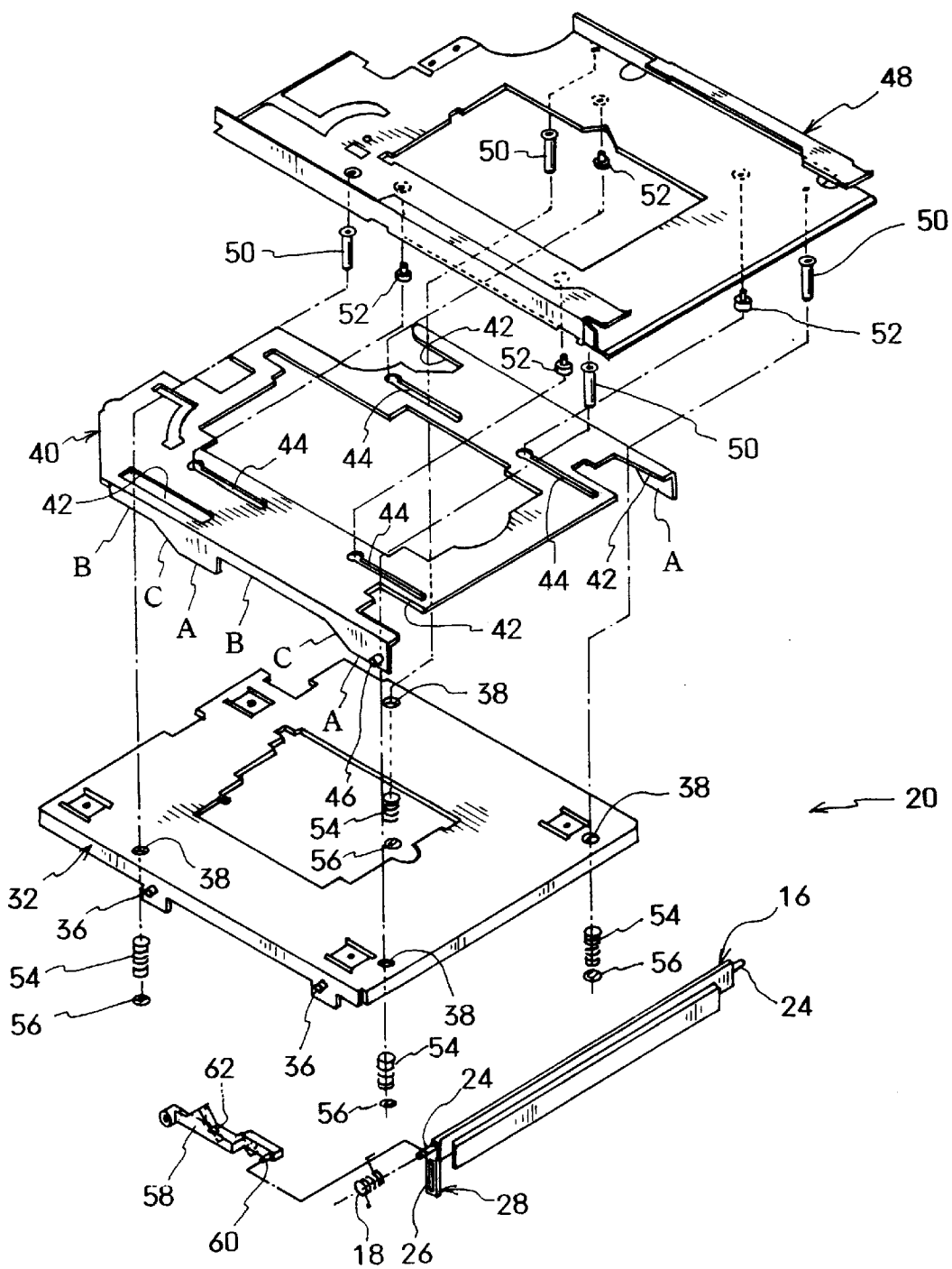
FIG. 1 is an exploded perspective view of a loading mechanism of an audio-book player of a first embodiment.

Firstly, a basic structure of the first embodiment will be explained with reference to FIGS. 1 and 2. In the present embodiment, an audio-book player 10 reproduces writing data recorded on a recording medium: a random accessible CD-ROM. But other media, e.g., a flexible disk, an IC card including a RAM, may be employed as the recording medium.

In the present invention, identifying means, which identifies a loading state in which the CD-ROM is loaded in the audio-book player 10 and an unloading state in which the CD-ROM is unloaded therefrom, is provided to a body proper 12 of the audio-book player 10, the tactile impression of the identifying means is changed in each state. The identifying means of the present embodiment comprises: a door member 16 for opening and closing a loading entrance 14; and a door spring 18 for always biasing the door member 16 to close the entrance 14. There is provided means for holding the door member 16 so as not to open the loading entrance 14 while the CD-ROM is in the body proper 12. In the present embodiment, a CD-ROM loading mechanism acts as the holding means.

Firstly, the loading mechanism 20 will be explained.

The loading entrance 14, into which the CD-ROM is loaded and from which the CD-ROM is unloaded, is formed in a front panel of the body proper 12. Note that, the CD-ROM is accommodated in a caddie 22 and loaded in the body proper 12 of the audio-book player 10 together with the caddie 22.

The door member 16 is pivotably provided to the loading entrance 14. Shafts 24 respectively projects from upper end sections of both side faces of the door member 16. The shafts 24 are rotatably held at positions in the vicinity of an upper edge of the loading entrance 14, so that the shafts 24 act as door axes, and the door member 16 is capable of swinging, in the body proper 12, inward. The door spring 18, e.g., a coil spring, covers the shaft 24 so as to always bias the door member 16 toward the front panel to close the loading entrance 14. An extended piece 28, which has a groove 26 (or a long hole), is extended from one end of the door member 16.

A base chassis 30 is fixed on an inner bottom face of the body proper 12.

A plate chassis 32 is formed into a plate and attached on the base chassis 30 with dampers 34, each of which comprises: a rubber cushion 34a; and a coil spring 34b. Two supporting pins 36, which are provided at the same height, horizontally project from each side face, which is formed by bending a side edge section, of the plate chassis 32. The plate chassis 32 has four first guide holes 38 through which up-down guides of a caddie holder (explained later) are inserted.

A sliding plate 40 is formed into a plate, and includes a width slightly greater than that of the plate chassis 32. The slicing plate 40 is mounted on the plate chassis 32 and is capable of sliding, along the side faces of the plate chassis 32, in a direction perpendicular to the loading entrance 14. Each side section of the sliding plate 40 has: two first horizontal sections A; two second horizontal sections B, each of which is formed above and provided on the inner side of the first horizontal section A; two diagonal sections C, each of which connects the first horizontal section A with the second horizontal section B. Note that, the distance between the two diagonal sections C is equal to the distance between the supporting pins 36.

Since the sliding plate 40 is mounted on the plate chassis 32 and the side sections of the sliding plate 40 are supported by the supporting pins 36, the sliding plate 40 is vertically moved within a distance, which is equal to a vertical distance between the first horizontal section A and the second horizontal section B. At the highest position, the sliding plate 40 corresponds to the loading entrance 14; at the lowest position, the caddie 22, which has been attached to the caddie holder, is set in a playing position at which the CD-ROM is played to reproduce written data recorded thereon as voice.

The sliding plate 40 has second guide holes 42 (or second guide notches), each of which is bored in the longitudinal direction, corresponding to each first guide hole 38. The sliding plate 40 also has four third guide holes 44, which are bored in the longitudinal direction, so as to limit movement of the caddie holder with respect to the sliding plate 40. A rear end section of each third guide hole 44 is wider than a rest section. The sliding plate 40 has a actuating pin 46, which projects outwardly from one of side faces, and which is provided in the vicinity of the loading entrance 14.

Note that, the sliding plate 40 is moved back and forth, with respect to the caddie holder, by a motor (not shown).

The caddie holder 48 is formed into a plate. Both side sections of the caddie holder 48 are bent upwardly to hold the caddie 22. A front end section of the caddie holder 48, from which the caddie 22 is inserted, is made wider, so that the caddie 22 can be easily inserted therein. Four columnar up-down guides 50, which respectively correspond to the first guide holes 38 of the plate chassis 32, extend downwardly from a bottom face of the caddie holder 48; four columnar slide guides 52, whose lower end sections are made wider and which respectively correspond to the third guide holes 44 of the plate chassis 32, extend downwardly from the bottom face of the caddie holder 48. The diameter of the lower end section of each slide guide 52 is slightly shorter than the width of the wider rear end section of the third guide hole 44; the diameter of the lower end section of each slide guide 52 is slightly greater than the width of the rest section (the long groove section) of the third guide hole 44; the diameter of the rest section (the short diameter section) of each slide guide 52 is slightly shorter than the width of the the long groove section of the third guide hole 44.

Next, connecting structures among the caddie holder 48, the sliding plate 40, the plate chassis 32 and the base chassis 30 will be explained.

The up-down guides 50 are respectively inserted through the second guides holes 42 (or the second notches), and the large diameter sections of the slide guides 52 are respectively fitted in the large diameter sections of third guide holes 44. Then, the slide guides 52 are shifted into the long groove sections of the third guide holes 44, so that the caddie holder 48 can be assembled. Thus, the large diameter sections of the slide guides 52 are engaged with the edges of the third guide holes 44 of the sliding plate 40, so that the caddie holder 48 can be assembled with the sliding plate 40.

The caddie holder 48, which has been assembled with the sliding plate 40, is mounted on the plate chassis 32 by inserting the up-down guides 50 in the first guide holes 38 of the plate chassis 32, so that the sliding plate 40 is sandwiched by the caddie holder 48 and the plate chassis 32. Coil springs 54 respectively cover the up-down guides 50, which project downwardly from the first guide holes 38. The coil springs 54 are kept on the up-down guides 50 by snap rings 56, e.g., E-rings. With this structure, the coil springs 54 are elastically provided between a bottom face of the plate chassis 32 and the E-rings 56, so the coil springs 54 always bias the caddie holder 48 and the sliding plate 40 towards the plate chassis 32.

A door lever 58 constitutes a part of the holding means. One end of the door lever 58 is pivotably attached on an inner bottom face of the body proper 10 or base chassis 30; the other end of the door lever 58 has a boss 60. The boss 60 is slidably fitted in the long groove 24 of the extended piece 28. With this structure, the other end of the door lever 58 is always biased by the spring 18, which has been attached to the door member 16, and the door member 16 is always biased to close the loading entrance 14.

Figure 10:
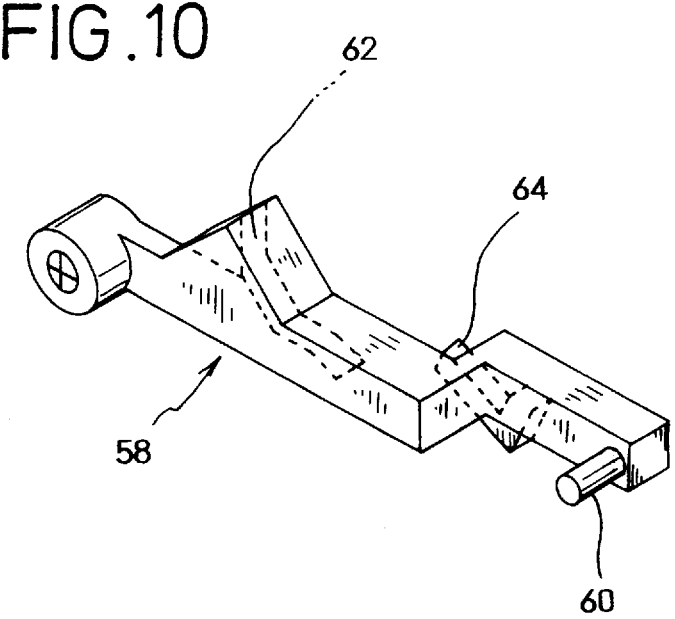
FIG. 10 is a perspective view of a door lever.

As shown in FIG. 10, the door lever 58 has a cam face 62, which contacts the actuating pin 46, and an L-shaped locking section 65, which is capable of engaging with a lower front edge of the sliding plate 40 so as to prevent the door member 16 from opening the loading entrance 14 while the caddie holder 48 stays at the playing position.

Successively, the open-close action of the door member 16, which is actuated by the loading mechanism 20 will be explained with reference to FIGS. 2–7.

Figure 2:
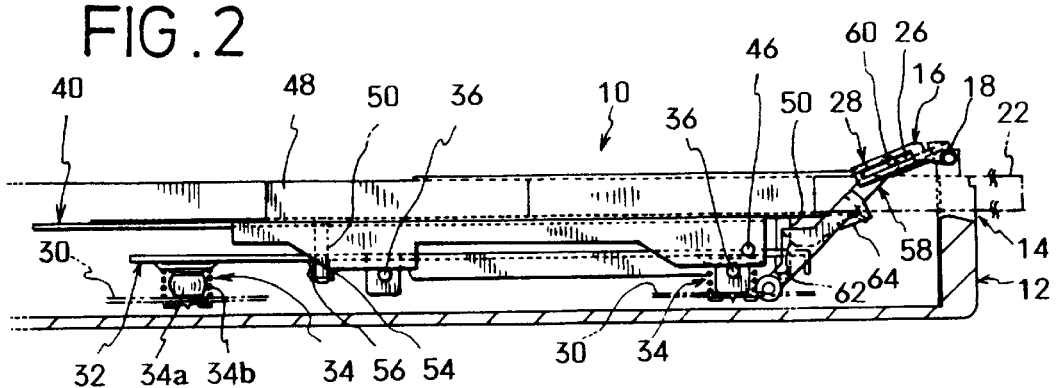
FIG. 2 is a side view showing a state of inserting a caddie through a loading entrance.
Figure 3:
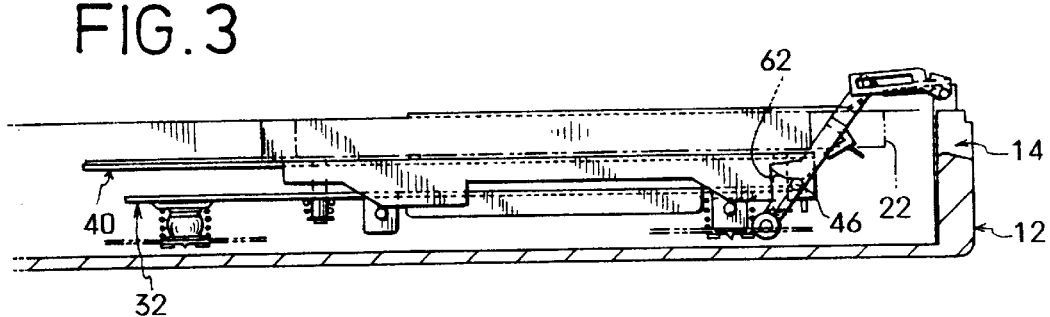
FIG. 3 is a side view of a sliding plate horizontally sliding, in which first horizontal sections of the sliding plate are supported by supporting pins.
Figure 4:
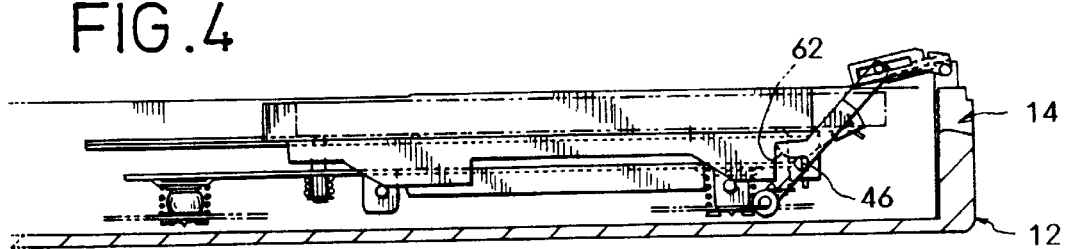
FIG. 4 is a side view showing a state of supporting diagonal sections of the sliding plate by the supporting pins.
Figure 5:
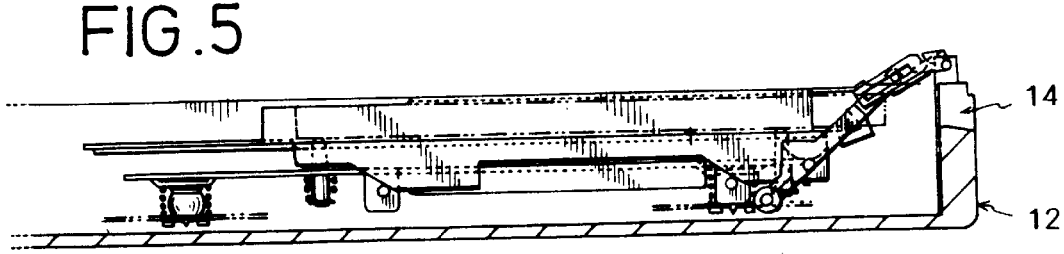
FIG. 5 is a side view of the sliding plate moving forward and downward, in which diagonal sections of the sliding plate are supported by the supporting pins.

In FIG. 2, the caddie 22 is inserted into the body proper 12, in which no other caddie has been loaded, through the loading entrance 14. The door member 16 is pushed inwardly by the caddie 22. When the caddie 22 reaches a prescribed position on the caddie holder 48 and is locked there, the loading mechanism 20 actuates to move the sliding plate 40 towards the loading entrance 14.

Figure 6:
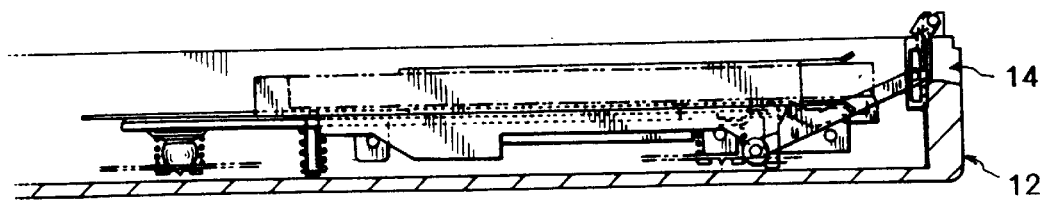
FIG. 6 is a side view showing a state of supporting second horizontal sections of the sliding plate by the supporting pins.
Figure 7:
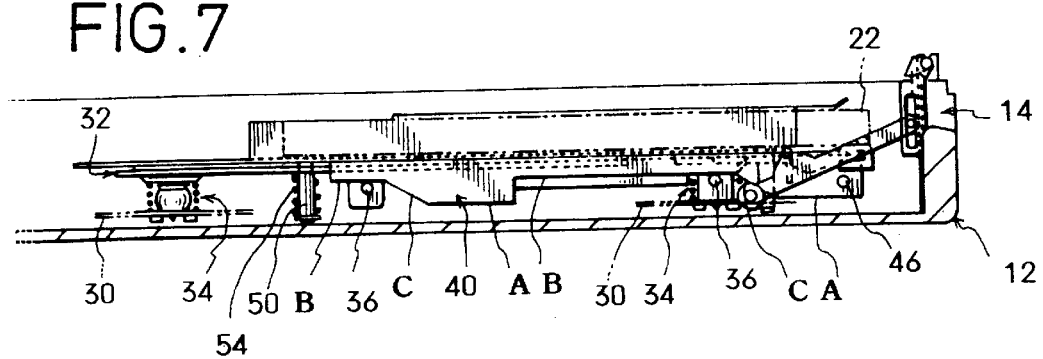
FIG. 7 is a side view of the sliding plate, which stays at a playing position and whose second horizontal sections are supported by the supporting pins.

Since the sliding plate 40 is mounted on the plate chassis 32 by supporting the side sections of the sliding plate 40 with the supporting pins 36, contact sections of the sliding plate 40, which is contacting the supporting pins 36, are serially moved from the first horizontal sections A (see FIGS. 2 and 3) to the diagonal sections C (see FIGS. 4–6) and the second horizontal sections B (see FIGS. 6 and 7). While the diagonal sections C contact the supporting pins 36, the slide plate 40 diagonally moves downwardly along the diagonal sections C.

By the above described movement of the sliding plate 40, the caddie holder 48, whose up-down guides 50 have been inserted in the first guide holes 38 to limit the horizontal movement, is moved downwardly with respect to the plate chassis 32 at a prescribed position. Then the caddie 22, which has been held by the caddie holder 48, is moved from a position, whose height is equal to that of the loading entrance 14, to the playing position in the body proper 12.

While the first horizontal sections A of the sliding plate 40 are supported by the supporting pins 36 and the sliding plate 40 horizontally moves towards the loading entrance 14 (from a state shown in FIG. 2 to a state shown in FIG. 3), the actuating pin 46, which is provided to the front end section of the sliding plate 40, contacts the cam face 62 of the door lever 58, so that the other end of the door lever 58, in which the boss 60 is formed, is moved upwardly. With this action, the door member 16 is further swung inwardly, so that a lower edge of the door member 16, which has been located at a lower position where the lower edge of the door member 16 contacts an upper face of the caddie 22 when the caddie 22 is inserted, is moved upwardly until reaching an upper position at which the lower edge of the door member 16 does not contact the upper face of the caddie 22. By moving the lower edge of the door member 16 to the upper position, a front end face (an end face on the loading entrance 14 side) can be prevented from interference with the lower edge of the door member 16 while the caddie 22 is unloaded through the loading entrance 14.

When the sliding plate 40 is further moved towards the loading entrance 14 and the supporting pins 36 contact the diagonal sections C, the sliding plate 40 moves toward the loading entrance 14 and downward along the diagonal sections C (see FIGS. 4–6) as described above. With this action, the actuating pin 46 is also moved downward, so that the door lever 58, which has been supported by the actuating pin 46, is moved toward the loading entrance 14 together with the actuating pin 46. When the supporting pins 36 reach mid positions of the diagonal sections C, the door member 16 completely closes the loading entrance 14, so that the movement of the door member 16 and the door lever 58 are stopped and the actuating pin 46 is separated away from the cam face 62 of the door lever 58.

When the sliding plate 40 is further moved towards the loading entrance 14 and the supporting pins 36 contact the second horizontal sections B (see FIG. 6), the vertical movement of the sliding plate 40 is stopped, but the horizontal movement of the sliding plate 40 is continued until the sliding plate 40 reaches a prescribed position. When the horizontal movement of the sliding plate 40 is stopped, the front end (the end on the loading entrance 14 side) of the sliding plate 40 is located above the locking section 64 of the door lever 58 with a small gap therebetween.

With this structure, if the door member 16 is pushed inwardly, the door member 16 is slightly moved inwardly and the door lever 58 is slightly moved upwardly. But the locking section 64 comes into contact with the front edge of the sliding plate 40, so that the movement of the door lever 58 is stopped and the door member 16 is prevented from moving.

Therefore, if the caddie 22 is not loaded in the body proper 12, the door member 16 can be moved inwardly; if the caddie 22 is loaded therein, the door member 16 cannot be moved inwardly, so that a blind person can understand if the caddie 22 is loaded in the body proper 12 or not by pushing the door member 16. And, another caddie cannot be inserted into the body proper 12 while the caddie 22 is positioned in the body proper 12, thus damage to the audio-book player 10 by inserting another caddie can be prevented.

If the caddie holder 48 is located at the playing position, there is formed the gap between the locking section 64 and the sliding plate 40. By the gap, vibration applied to the body proper 12 cannot reach the sliding plate 40, so that a bad influence to an optical pick-up, which reproduces the written data, can be prevented.

(Second Embodiment)

Figure 8:
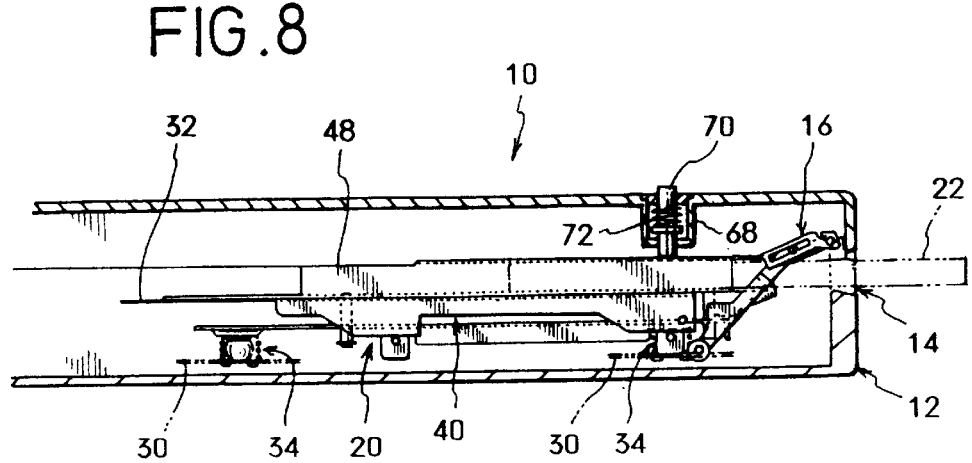
FIG. 8 is a side view of a second embodiment, in which the caddie is inserted through the loading entrance.
Figure 9:
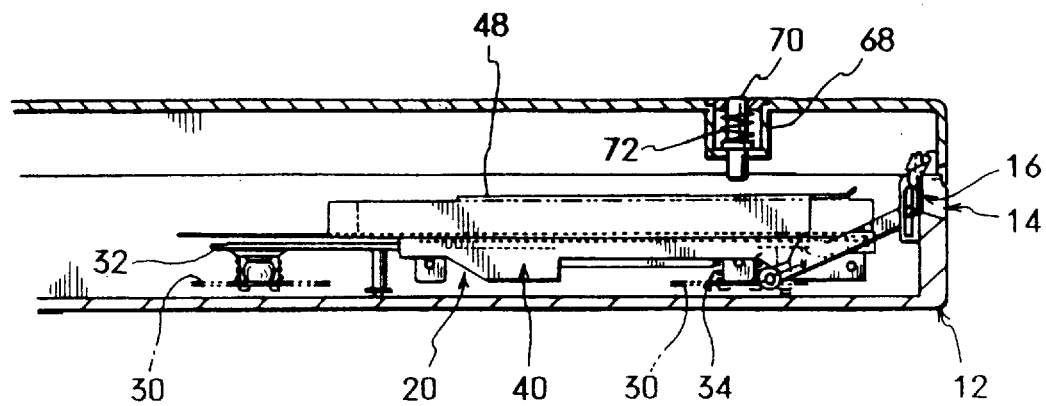
FIG. 9 is a side view of the caddie shown in FIG. 8, which has been moved to the playing position.

The basic structure of the second embodiment will be explained with reference to FIGS. 8 and 9. Note that, the elements which have been explained in the first embodiment are assigned the same numeric symbols and explanation will be omitted.

In the audio-book player 66 of the Second Embodiment, the identifying means has a moving member 70 provided in a through-hole 68 of the body proper 12. The moving member 70 is capable of projecting outwardly from and retracting into the through-hole 68. The projecting length, from the body proper 12, of the moving member 70 is changed, by a moving means, according to the loading state, in which the CD-ROM is loaded in the body proper 12, or the unloading state, in which the CD-ROM is not loaded in the body proper 12.

In the present embodiment, the loading mechanism 20 acts as the moving mechanism. The loading mechanism 20 acts as well as the first embodiment.

The identifying means will be explained.

The cylindrical through-hole 68 is bored in a side edge section of an upper face of the body proper 12. The through-hole 68 is located at a position corresponding to a side edge section of the caddie holder 48, which is formed into a U-shape. The columnar moving member 70 is vertically pierced through the through-hole 68, and it cannot be pulled out therefrom.

The moving member 70 is always biased downwardly by a coil spring 72, which covers the moving member 70 and which is elastically provided in the through-hole 68. The coil spring 72 constitutes a part of the identifying means.

If the caddie holder 48 of the loading mechanism 20 locates at the highest position at which the caddie 22 can be loaded into the caddie holder 48, the lower end of the moving member 70 is pushed upwardly by an upper face of the U-shaped side edge section of the caddie holder 48, so that an upper end section of the moving member 70 projects a prescribed length from the upper face of the body proper 12. On the other hand, if the caddie holder 48 is moved downwardly or towards the playing position by the loading mechanism 20, the moving member 70 is moved downwardly by the elasticity of the spring 72 together with the caddie holder 48. The upper end of the moving member 70 is retracted into the through-hole 68 by the time the caddie holder 48 reaches the playing position, then the downward movement of the moving member 70 is stopped. The caddie holder 48 is further moved until reaching the playing position. When the caddie holder reaches the playing position, the lower end of the moving member 70 is separated away from the caddie holder 48. Since the moving member 70 is separated away from the caddie holder 48 which locates at the playing position, vibration applied to the body proper 12 cannot reach the sliding plate 40 and the optical pick-up via the moving member 70, so that a bad influence can be prevented.

With this structure, the moving member 70 locates at a first position or the highest position (see FIG. 8) when no caddie is loaded in the body proper 12. In this case, the moving member 70 projects the prescribed length from the upper face of the body proper 12. On the other hand, the moving member 70 is moved to a second position or the lowest position (see FIG. 9) in the through-hole 68 (or in the body proper 12) by the coil spring 72 when the caddie 22 is loaded in the body proper 12. In this case, the moving member 70 is completely retracted in the through-hole 68.

Thus, the blind person can know if the moving member 70 projects from the upper face of the body proper 12 or not by touching the upper face thereof, namely the blind person can know if the caddie 22 is loaded in or unloaded from the body proper 12.

In the present embodiment, the moving member 70 is completely retracted in the through-hole 68 when the caddie 22 is loaded in the body proper 12. But the moving member 70 need not be completely retracted in the through-hole 68. Namely, if change of the projected length of the moving member 70 can be known by touching the moving member 70, the moving member 70 need not be completely retracted in the through-hole 68.

In the first embodiment and the second embodiment, the loading mechanism 20, which is employed in the conventional audio-book player too, is used as the holding means or the moving means. For example, a control means including a motor for moving the identifying means may be employed as the holding means or the moving means. In this case, the control means controls the motor linking with the movement of the loading mechanism 20 so as to lock or unlock the door member 16 or so as to change the projected length of the moving member 70.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An audio-book player, which reproduces written data recorded on a recording medium as voice, comprising:
   a body proper into which said recording medium can be loaded and unloaded; and
   means for identifying a loading state, in which said recording medium is loaded in said body proper, and an unloading state, in which said recording medium is unloaded therefrom, said identifying means identifying said states by changing tactile impression.

2. The audio-book player according to claim 1,
   wherein said identifying means includes:
   a moving member being provided in a through-hole of said body proper, said moving member being capable of projecting outwardly from and retracting into the through-hole; and
   means for moving said moving member so as to change a projecting length of said moving member from said body proper according to said states.

3. The audio-book player according to claim 2,
   wherein said moving member is always biased inwardly by a spring,
   said moving means moves said moving member to a first position, at which said moving member projects from said body proper, while said audio-book player is in said unloading state, and
   said moving means releases said moving member so as to move said moving member to a second position, at which said moving member is retracted in said body proper, by said spring while said audio-book player is in said loading state.

4. The audio-book player according to claim 2,
   wherein said moving means is a loading mechanism, which conveys said recording medium to a playing position in said body proper when said recording medium is inserted in the loading entrance, and which conveys the same from the playing position to the loading entrance when playing said recording medium is stopped.

5. The audio-book player according to claim 1, wherein said identifying means includes:

a door member for opening and closing a loading entrance of said body proper, from which said recording medium is loaded into said body proper;

a spring for always biasing said door member to close the loading entrance; and means for holding said door member so as not to open the loading entrance while said audio-book player is in said loading state.

6. The audio-book player according to claim 5, wherein said holding means includes:

a loading mechanism, which conveys said recording medium to a playing position in said body proper when said recording medium is inserted in the loading entrance, and which conveys the same from the playing position to the loading entrance when playing said recording medium is stopped; and a door lever having one end pivotably connected to said body proper and the other end pivotably connected to said door member, said door lever is actuated by said loading mechanism when said loading mechanism conveys said recording medium to the playing position, whereby said door member is moved to close the loading entrance and held in the closing state.

* * * * *